UNITED STATES PATENT OFFICE.

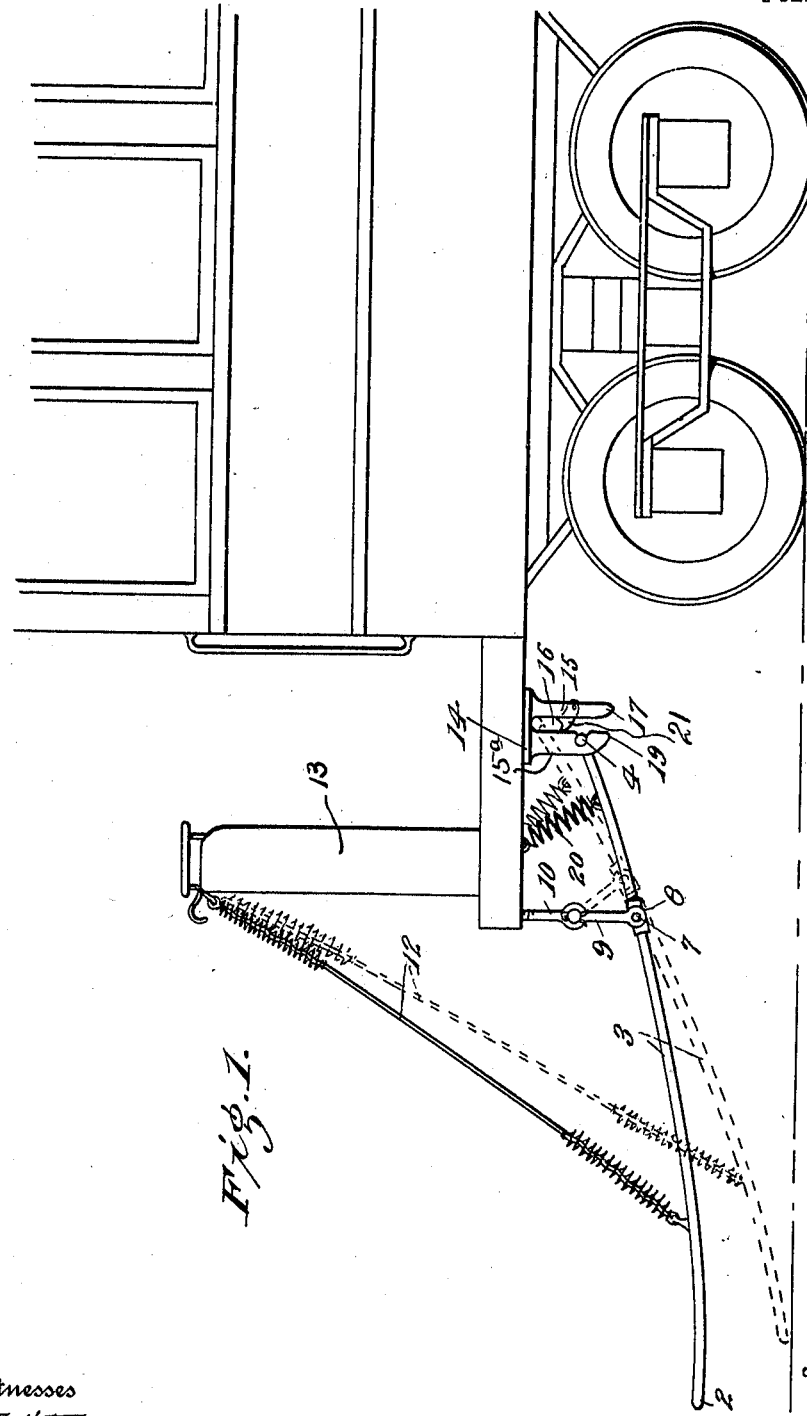

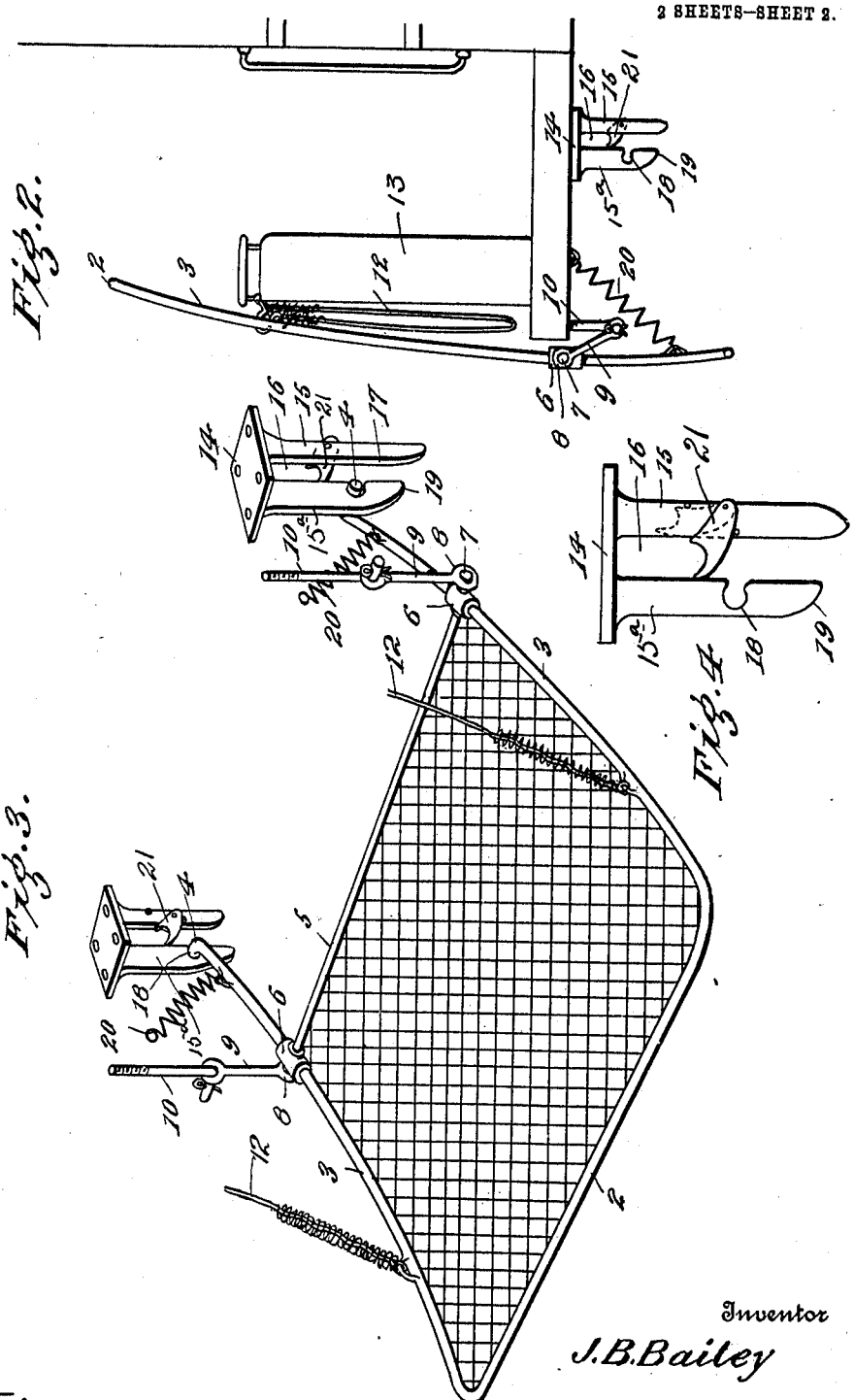

JOHN B. BAILEY, OF FOREST HILL, MARYLAND.

CAR-FENDER.

993,639.

Specification of Letters Patent.  Patented May 30, 1911.

Application filed June 8, 1910.  Serial No. 565,773.

*To all whom it may concern:*

Be it known that I, JOHN B. BAILEY, citizen of the United States, residing at Forest Hill, in the county of Harford and State of Maryland, have invented certain new and useful Improvements in Car-Fenders, of which the following is a specification.

This invention relates to car fenders, and the primary object of the invention is to provide a car fender which is normally held above the level of the street or roadway, but which when struck by a body will be depressed so as to bring the forward edge of the fender approximately on a level with the roadway, thus preventing the fender from slipping over the object so struck, but permitting the fender to slip beneath said object.

Another object of the invention is to greatly simplify the construction of fenders of this character, and to provide a fender having a very few parts, easily applied to any ordinary street car without alteration therein, and in which the fender proper may be turned up into a vertical position in front of the dashboard of the car when not in use.

The invention consists, generally speaking, in a fender which is suspended from the bottom of the car by loose links, permitting the fender to have a rotative movement to bring its forward edge to a level with the roadway, or to permit the fender to be turned up into a vertical position in front of the dashboard of the car, the rear end of the fender frame extending beyond the suspending means and being engaged with detaining recesses formed on a hanger depending from the under side of the car body, this hanger being so formed that when the fender strikes an object the fender will be moved bodily rearward so as to release the rear ends of the fender frame from their engagement with the detaining recesses, thus permitting the front end of the fender frame to drop down under the weight of the object struck and so slip beneath the object.

My invention is shown in the accompanying drawings wherein:—

Figure 1 is a side elevation of a front part of a car showing my improved fender in place thereon and in its normal position, the dotted lines indicating the position taken by the fender when its forward end is depressed. Fig. 2 is a like view to Fig. 1 but showing the fender in its folded position. Fig. 3 is a detail perspective view with the parts of the fender removed from the car, and showing the parts in their normal position. Fig. 4 is an enlarged side elevation of one of the hangers detached from the car, the latch being shown in its operative position by full lines.

Referring to these figures 2 designates the front cross bar of a fender frame and 3 the side bars thereof which are integral with the cross bar and extend rearward beyond the fender netting proper, and are then bent at right angles as at 4.

5 designates the rear cross bar of the fender frame, which is connected to the side bars 3 by means of a coupling 6, each coupling being provided with the outwardly projecting headed stud 7. Links 9 are provided at their lower ends with eyes 8 through which the studs pass, the upper ends of the links being provided with eyes by which the links are connected to eyebolts 10 or like devices depending from the bottom of the car 11, forward of the dashboard. Connections 12 extend down from the dashboard to the forward portion of the fender. Preferably, these connections extend down on each side to each of the side bars 3, and preferably these connections are formed by a strap or cord attached at its upper end to the dash board or any other fixed part of the car, the lower ends of the connections being attached to the side bars 3. Preferably coiled springs surround the lower ends of the connections 12, these springs being attached at opposite ends to the side bars of the fender and to the connection 12. That portion of the rope or strap 12 which passes through the coiled spring is loose so that the tension shall come upon the coiled spring under normal circumstances, and only when the spring breaks will the loose portion of the connection 12 within the spring become taut. It will be seen that this construction permits the front portion of the fender to move downward and at the same time act to resiliently support the front portion of the fender up in its normal position. The side bars 3 are extended beyond the couplings 6, as before described, and hence beyond the pivotal point of the fender, the extremities of the side bars being outwardly bent as at 4, as previously stated. These outwardly bent ends are received in hangers, each hanger being formed of a base plate 14 and downwardly extending webs 15, 15ª spaced from each other to define a longitudinally extending slot 16. The rear wall of the slot is rounded as at 17 to permit the insertion of the angularly bent end 4, while the other wall of the slot is straight and is provided at a point above its lower end with a semicircular recess 18 adapted to fit the outwardly bent end 4.

When the outwardly bent ends 4 are disposed within the recesses 18, it will be seen that the rear end of the fender is prevented from any upward movement, and therefore that the front end of the fender is prevented from any downward movement. When, however, the fender contacts with an object in the path of the car, the first effect of the contact will be to move the fender bodily rearward, thus moving the angular terminations 4 out of the recesses 18, and into the slot 16. As this slot extends upward to the upper end of the hanger 15 it will permit the rear ends of the fender frame to move upward and thus permit the front end of the fender to move downward into the position shown in dotted lines in Fig. 1.

In order to permit the easy insertion of the angularly bent ends 4 into the slots 16 when it is desired to unfold the fender and replace it in its operative position, I form the front edge of the web 15ª at its lower end with a curved face 19 so that the angular end 4 will be guided toward the slot. The curved edge 17 of the web 15 on the other side of the slot extends slightly below the extremity of the web 15ª on the forward side of the slot, and thus as the angular termination 4 moves downward over the curved face 19 it will slip by the lower end of the forward web and slip easily into the slot 16.

In order to assist the upward movement of the rear end of the fender frame beyond the pivotal points 7, I provide the springs 20 which are attached to the frame of the car and to the rear ends of the side bars 3. These act to draw the rear ends of the fender frame upward, and hence to draw the angular terminations 4 into snug engagement with the recesses 18. They also act when the fender frame is moved bodily rearward under shock and is released from the recesses, to draw the rear ends of the fender frame upward so that the angular terminations will travel upward in the slot 16 to the upper ends thereof.

As shown in Fig. 2, the fender frame may be turned upward into a vertical position and fastened to the dashboard 13 of the car in any suitable manner. The links 9 it will be seen rotate upon the lower end of the eyebolt 10, thus bringing the rear ends of the fender frame above the surface of the street or roadway. It will be seen that in order to place the fender in a vertical position, it is only necessary to move the fender rearward until the angular terminations 4 are disengaged from the recesses 18, and then rotate the fender frame to cause the angular terminations 4 to pass out of the slot 16.

In order to support the rear end of the fender frame when it has been raised by the depression of its forward end caused by the fender striking an obstruction, I provide each hanger with a latch 21 which is pivoted to the rear web 15 and normally extends across the slot 16, and rests against a pin on the inside wall of the slot, and when up against a pin on the side face of the web 15ª as shown in Fig. 4. The under face of this latch is rounded while the upper face is formed with a concave recess 22. It will be obvious that when the fender is pushed back and its rear end is rotated that the laterally projecting terminations 4 will ride up in the slots 16, raise the latches 21 and pass into the upper portions of the slots, and that as soon as these terminations have so passed, the latches will fall preventing any return of the fender to its ordinary position.

While I have shown what I believe to be the preferable form of my invention, I do not wish to be limited to the exact arrangement of parts or the details of construction, as it is obvious that many changes may be made in both of these respects without departing from the spirit of the invention.

My improved fender is extremely simple, has but few parts, may be applied to a car of any ordinary construction without change therein, and is thoroughly effective. It works automatically and is not dependent upon the motorman in order that it may be placed in an operative position.

What I claim is:

1. In a fender for street cars, a fender frame suspended from the car in such manner as to permit the frame to have a rearward movement when struck and a rotative movement to lower the front of the frame, said frame having rearwardly extending members with laterally extending terminations, and oppositely disposed members depending from the car behind which the terminal ends of said frame members engage, the rear edge of each depending member being formed with a recess.

2. In a fender for street cars, a fender frame, vertically disposed links pivotally supported at their upper ends for a rearward swinging movement and pivotally attached at their lower ends to the fender frame forward of the rear end of said frame, said links permitting the frame to have a rearward movement when struck and a rotative movement to lower the front end of the frame, and a detaining device engaging the rear end of the frame to prevent any rotative movement thereof and holding the front end of the frame above the level of the car track but releasing the frame when the frame is forced rearward by impact with an object, said detaining device being so constructed as to permit the fender frame to be entirely withdrawn from engagement with the detaining device and moved into a vertical position against the dashboard of the car.

3. In a fender for street cars, a fender frame, links pivotally supported by the car and pivoted to the fender frame, the rear end of the frame extending beyond said links, and a detaining device mounted on the car engaging the rear end of the frame to prevent any rotary movement of the frame and holding the front end thereof above the level of the roadway, said detaining device being adapted to permit a rearward movement of the fender under the impact of an object and an upward movement of the rear end of the fender.

4. The combination with a street car, of downwardly projecting supports mounted at the extreme forward end of the car, said supports having eyes in their lower ends, a fender frame, links pivoted at their lower ends to the fender frame forward of the rear end of the frame, the upper ends of said links being pivoted to the downwardly depending supports to permit the frame to have a bodily rearward movement when struck and a rotative movement to lower the front of the frame, and a detaining device engaging the rear end of the frame, said links normally preventing an upward movement of the frame but permitting a rearward movement thereof to disengage the frame from the detaining device, and when so disengaged permitting the frame to be rotated upon the links.

5. In a fender for street cars, a fender frame, links pivotally supported by the car, and pivoted to the fender frame, the side bars of the fender frame extending rearward beyond said links and being provided with laterally extending terminal ends, and oppositely disposed hangers supported from the bottom of the car, each of said hangers being formed with a vertical slot open at the lower end to accommodate the lateral termination of the frame bars on the corresponding side, the front wall of the slot having a recess to receive said lateral terminations and normally preventing the rear end of the frame from moving upward but permitting the rear end of the frame to move rearward and the laterally extending terminations to move into said vertical slots.

6. In a fender for street cars, a fender frame, links suspending the frame from the car and permitting the frame to have a rearward movement when struck, and a rotative movement to lower the front of the frame, detaining devices depending from the floor of the car and engaging the rear end of the frame to prevent a rotative movement thereof and hold the front end of the frame above the level of the car track, but releasing the frame when the frame is forced rearward by impact with an object to permit the rear end of the frame to move upward, and springs connected to the bottom of the car and to the rear end of the frame, and acting to draw it up when released from the detaining devices.

7. In a fender for street cars, a fender frame having side bars, the rearward extremities of the side bars being laterally bent, links pivotally supported by the car, and pivoted to the side bars of the fender frame, forward of the laterally bent terminations thereof, hangers depending from the bottom of the car on opposite sides thereof, rearward of said links, each hanger having a vertical slot, the forward wall of the slot being recessed for engagement with the laterally bent ends of the fender frame, and springs acting to draw the rear ends of the fender frame upward.

8. In a fender for street cars, a fender frame, links suspending the frame from the car, and to the lower ends of which the fender frame is pivoted, said links permitting the frame to have a rearward movement when struck, and a rotative movement to lower the front end of the fender frame, resilient connections between the front of the car and the front end of the fender, and acting to yieldingly support the front end of the fender above the roadway, springs attached to the bottom of the car and connected to the rear end of the fender, rearward of the connection of the fender frame to said links, and acting to depress the forward end of the fender frame, and detaining devices engaging the rear ends of the fender frame, holding the front end of the fender frame above the level of the car track, but permitting the fender frame to move rearward, and the rear end of the fender frame to rise.

9. In a fender for street cars, a fender frame having rearwardly extending side bars, links suspending the frame from the car and permitting the frame to have rearward movement when struck and a rotative movement to lower the front of the frame, detaining devices depending from the floor of the car and engaging the rear end of the frame to prevent a rotative movement thereof and to hold the front end of the frame above the level of the car track but releasing the frame when the frame is forced rearward by impact with an object to permit the rear end of the frame to move upward, and latches permitting the upward movement of the rear end of the frame when so released and then engaging the side bars of the frame to prevent a downward movement thereof.

10. In a fender for street cars, a fender frame having side bars, the rearward extremities of the side bars being laterally bent, links pivotally connected to the bottom of the car at one end and at the other end having pivotal engagement with the side bars of the frame forward of the laterally bent terminations thereof, hangers depending from the bottom of the car on opposite sides thereof rearward of said links, each hanger having a vertical slot open at its lower end, the forward wall of the slot being recessed for engagement with the laterally bent end of the fender frame bar on that side, and a latch mounted one on each hanger, said latches being adapted to be raised when the rear ends of the side bars are released to permit the upward movement of the rear ends of the side bars, said latches then engaging beneath the rear ends of the side bars to prevent the return downward movement of the side bars.

11. In a fender for street cars, a fender frame having side bars, the rearward extremities of which are laterally bent, links pivotally supported by the car, and pivoted to the side bars of the fender frame, forward of the bent terminations thereof, hangers depending from the bottom of the car on opposite sides thereof and rearward of said links, each hanger having a vertical slot, the forward wall of the slot being recessed for the engagement of the laterally bent end of the fender frame on the corresponding side, and latches for each hanger, pivoted thereon and normally extending across said slots and in the path of movement of the terminal ends of the side bars, said latches opening to permit the upward movement of the rear ends of the side bars but preventing a downward movement thereof after they have been so engaged.

12. In a fender for street cars, a fender frame having side bars, pivoted means for supporting the fender frame permitting it to have a rotative movement and a rearward movement, a detaining device engaging the rear end of the frame and preventing an upward movement of said rear end but permitting a rearward movement thereof to disengage the frame from the detaining device, and a latch engaging the rear end of the frame upon an upward movement thereof and holding the rear end in a raised position and the forward end of the frame depressed.

13. In a fender for street cars, a fender frame having rearwardly projecting side bars, means for pivoting the frame forward of the rear ends of said side bars permitting the frame to have a bodily rearward movement when struck and a rotative movement to lower the front of the frame, a detaining device engaging the rear ends of said side bars, and when in engagement preventing an upward movement of the rear ends of the side bars but permitting a rearward movement thereof to disengage the frame from the detaining device, means whereby the rear end of the frame is urged upwardly against said detaining device, and a latch permitting the upward movement of the rear ends of the side bars but preventing any downward movement thereof.

In testimony whereof, I affix my signature in presence of two witnesses.

JOHN B. BAILEY. [L. S.]

Witnesses:
JOHN BAIRD,
ANNA LEE WILSON.

---

Copies of this patent may be obtained for five cents each, by addressing the "Commissioner of Patents Washington, D. C."